(12) United States Patent
Rockelmann et al.

(10) Patent No.: US 10,384,521 B2
(45) Date of Patent: Aug. 20, 2019

(54) ROLLER BLIND ARRANGEMENT FOR A MOTOR VEHICLE

(71) Applicant: Webasto SE, Stockdorf (DE)

(72) Inventors: Andreas Rockelmann, München (DE); Andreas Sedlmeir, Utting (DE); Armin Frommer, East Amherst, NY (US); Frank Koslowski, Moorenweis (DE)

(73) Assignee: WEBASTO SE, Stockdorf (DE)

( * ) Notice: Subject to any disclaimer, the term of this patent is extended or adjusted under 35 U.S.C. 154(b) by 50 days.

(21) Appl. No.: 15/144,466

(22) Filed: May 2, 2016

(65) Prior Publication Data

US 2017/0113522 A1    Apr. 27, 2017

Related U.S. Application Data

(63) Continuation of application No. 12/089,111, filed as application No. PCT/DE2006/001745 on Oct. 5, 2006, now Pat. No. 9,358,861.

(30) Foreign Application Priority Data

Oct. 7, 2005 (DE) .................. 10 2005 048 207

(51) Int. Cl.
*B60J 1/20* (2006.01)
*B60J 7/00* (2006.01)
(Continued)

(52) U.S. Cl.
CPC .......... *B60J 7/0015* (2013.01); *B60J 1/2041* (2013.01); *B60J 1/2052* (2013.01); *B60R 5/047* (2013.01); *E06B 9/58* (2013.01)

(58) Field of Classification Search
CPC ........ B60J 7/0015; B60J 7/067; B60J 1/2013; B60J 1/2016; B60J 1/2038; B60J 1/2041;
(Continued)

(56) References Cited

U.S. PATENT DOCUMENTS 1,471,572 A * 10/1923 Rydberg ................ A47H 21/00
160/11
1,684,190 A    9/1928 Moser
(Continued)

FOREIGN PATENT DOCUMENTS

| DE | 197 39 919 A1 | 3/1999 |
|---|---|---|
| DE | 20 2004 015857 U1 | 12/2004 |
| WO | 2006/053520 A2 | 5/2006 |

*Primary Examiner* — Katherine W Mitchell
*Assistant Examiner* — Jeremy C Ramsey
(74) *Attorney, Agent, or Firm* — Fitch, Even, Tabin & Flannery, LLP

(57) ABSTRACT

The invention concerns a shade system for a motor vehicle, said system being adapted to obscure a transparent bodywork element. Said shade system comprises at least one shade guideway, a winding shaft and lateral elements wherein are guided the lateral edges of the shade guideway. The lateral edges of the shade guideway have each a flat and flexible driving band. In order to ensure that said diving bands are wound on the winding shaft and are unwound therefrom in a specific manner, a lateral winding guide is arranged at the winding shaft for each driving band, said winding guides preventing the driving bands from being laterally offset at the winding shaft.

17 Claims, 5 Drawing Sheets

(51) Int. Cl.
*B60R 5/04* (2006.01)
*E06B 9/58* (2006.01)

(58) Field of Classification Search
CPC ... B60R 5/047; E06B 9/56; E06B 9/58; E06B 9/581; E06B 9/40; E06B 9/42; E06B 2009/587; E06B 9/17; B65H 16/06; B65H 23/005; B65H 23/02
USPC .............................. 242/419, 615, 156.1, 547
See application file for complete search history.

(56) References Cited

U.S. PATENT DOCUMENTS

| | | |
|---|---|---|
| 2,756,438 A | 7/1956 | Soberman |
| 3,116,097 A | 12/1963 | Novales |
| 3,304,034 A | 2/1967 | Jones |
| 3,731,887 A | 5/1973 | Wheeler |
| 3,882,921 A | 5/1975 | Sandall |
| 4,398,585 A | 8/1983 | Marlow |
| 4,425,182 A | 1/1984 | Jones et al. |
| 4,825,921 A | 5/1989 | Rigter |
| 5,129,442 A | 7/1992 | Warner |
| 5,385,315 A | 1/1995 | Rude et al. |
| 5,538,170 A | 7/1996 | Van Luit |
| 5,749,538 A | 5/1998 | Brown et al. |
| 5,901,921 A | 5/1999 | Perlsweig |
| 5,947,544 A * | 9/1999 | Hubeshi ................. B60J 1/2019 160/23.1 |
| 6,698,683 B2 | 3/2004 | Young |
| 6,942,003 B2 | 9/2005 | Thompson |
| 7,128,125 B2 * | 10/2006 | Harbison ................. E06B 9/42 160/273.1 |
| 2004/0113467 A1 | 6/2004 | Grimm et al. |
| 2005/0225123 A1 * | 10/2005 | Grimm ..................... B60J 7/00 296/214 |
| 2007/0277942 A1 | 12/2007 | Dondlinger et al. |
| 2008/0216973 A1 | 9/2008 | Walter |

* cited by examiner

ROLLER BLIND ARRANGEMENT FOR A MOTOR VEHICLE

CROSS-REFERENCE TO RELATED APPLICATIONS

This application is a continuation of U.S. application Ser. No. 12/089,111, filed Apr. 3, 2008, which is a U.S. national phase application filed under 35 U.S.C. § 371 of International Application No. PCT/DE2006/001745, filed Oct. 5, 2005, designating the United States, which claims priority from German Application No. 10 2005 048 207.4, filed Oct. 7, 2005, the contents of each of which are hereby incorporated by reference in their entirety for all purposes.

FIELD

The invention relates to a roller blind arrangement for a motor vehicle according to the preamble of patent claim 1.

BACKGROUND

In the motor vehicle sphere, roller blind arrangements are used in particular as sun protection in the region of transparent body elements, such as a transparent roof element. Furthermore, roller blind arrangements are also used as a loading space covering in the region of loading spaces of "station wagons".

A roller blind arrangement of the generic type mentioned in the introduction and provided for a vehicle roof is known from DE 197 39 919 A1 and comprises a roller blind web which can be wound onto and unwound from a winding shaft and is guided laterally in each case in a guide track of a guide rail. For fixing on the guide rails, the lateral border regions of the roller blind web have a respective border-stiffening means designed as a guide belt. The lateral guidance of the roller blind web by means of the border-stiffening means has the effect that the roller blind web is kept under tension transversely with respect to its extension direction and therefore the production of noise triggered by vibrations or the like can be minimized.

In the state wound up onto the winding shaft, the winding body formed by the roller blind web is in each case thickened in a bead-like manner in the region of the guide belts or border-stiffening means by means of the additional thickness of the guide belts. There is now the risk of the guide belts, during the winding-up and unwinding operations, being undesirably wound onto and unwound from the winding shaft in a laterally offset manner because of tensile forces acting in the direction of the center plane of the vehicle. Particularly if the vehicle concerned is traveling on a rough road, the guide belts may possibly not keep to their respective winding track. This may lead to the operation of the roller blind arrangement being impaired and even to its failing. This problem exists in particular in the case of roller blind arrangements with a large extension length.

SUMMARY

The invention is based on the object of providing a roller blind arrangement in which the roller blind web is provided with lateral guide belts and in which the guide belts can be wound onto and unwound from a winding shaft in a manner such that they always keep to their track.

The object is achieved according to the invention by the roller blind arrangement with the features of the patent claim 1.

The core of the invention consequently resides in providing a lateral supporting and guide element for the winding body of a guide belt of the roller blind web in the region of the winding shaft, said supporting and guide element having a supporting and guide function in particular during the winding-up and unwinding operation and ensuring that the individual coils of the relevant guide belt come to lie one above another in a manner such that they always keep to their track. Consequently, the winding guides constitute a winding-up and unwinding aid which prevents a lateral offset of the coils of the relevant guide belt in the region of the winding shaft, which, in turn, ensures that the roller blind web is wound up and unwound in a defined manner and such that it always keeps to its track.

The roller blind arrangement according to the invention can be used in particular to screen a transparent roof region of a motor vehicle.

In order to be able to accommodate changing winding body diameters of the roller blind web, in a preferred embodiment of the roller blind arrangement according to the invention, the respective winding guide is a flexible element which is arranged adjacent to the respective guide belt on that side of the relevant guide belt which faces away from the respective roller blind web border, and when the roller blind web border, and, when the roller blind web is wound onto the winding shaft, is matched to the increasing winding body diameter.

The flexible element, which can be manufactured from spring-elastic material, such as a spring steel, a plastic or even a foam material, is, for example, a resilient tab. The latter, in a region which borders the inside of the relevant guide belt, can rest on the roller blind web in the region of the winding shaft, and therefore that border of the relevant tab which is located on the outside, with respect to the winding shaft, ensures that the relevant guide belt is wound up and unwound in a defined manner.

The lateral winding guides can be manufactured integrally with a frame of the roller blind arrangement. A frame of this type is, for example, a cast part, during production of which the lateral winding guides can also be formed.

As an alternative, the lateral winding guides can each constitute a separate component which is fixed to a frame of the roller blind arrangement. An embodiment of this type may be required in order to be able to fit the roller blind web or the winding shaft in a corresponding receiving space of the frame of the roller blind arrangement without obstruction by the winding guides.

In an alternative embodiment of the roller blind arrangement according to the invention, the lateral winding guides are each formed from a guide box within which the relevant guide belt of the roller blind web is wound up and unwound and which has a curved cutout in which the winding shaft rotates. The wall which has the curved cutout keeps the relevant guide belt on its track during the winding-up and unwinding of the roller blind web. A guide box of this type is designed in the manner of a wheel house.

In order to be able to compensate for changing winding diameters and also to ensure guidance of the guide belt as the first coils are being made, the guide box can be mounted resiliently. The border of the curved cutout then interacts with the wound-up roller blind web. As the winding body diameter increases, the guide box yields back further, with the wall with the curved cutout always keeping the relevant guide belt on its track.

Further advantages and advantageous refinements of the subject matter according to the invention can be gathered from the description, the drawing and the patent claims.

Three exemplary embodiments of a roller blind arrangement according to the invention are illustrated in a schematically simplified manner in the drawing and are explained in more detail in the description below. In the drawing:

BRIEF DESCRIPTIONS OF DRAWINGS

DETAILED DESCRIPTION

Figure 1:
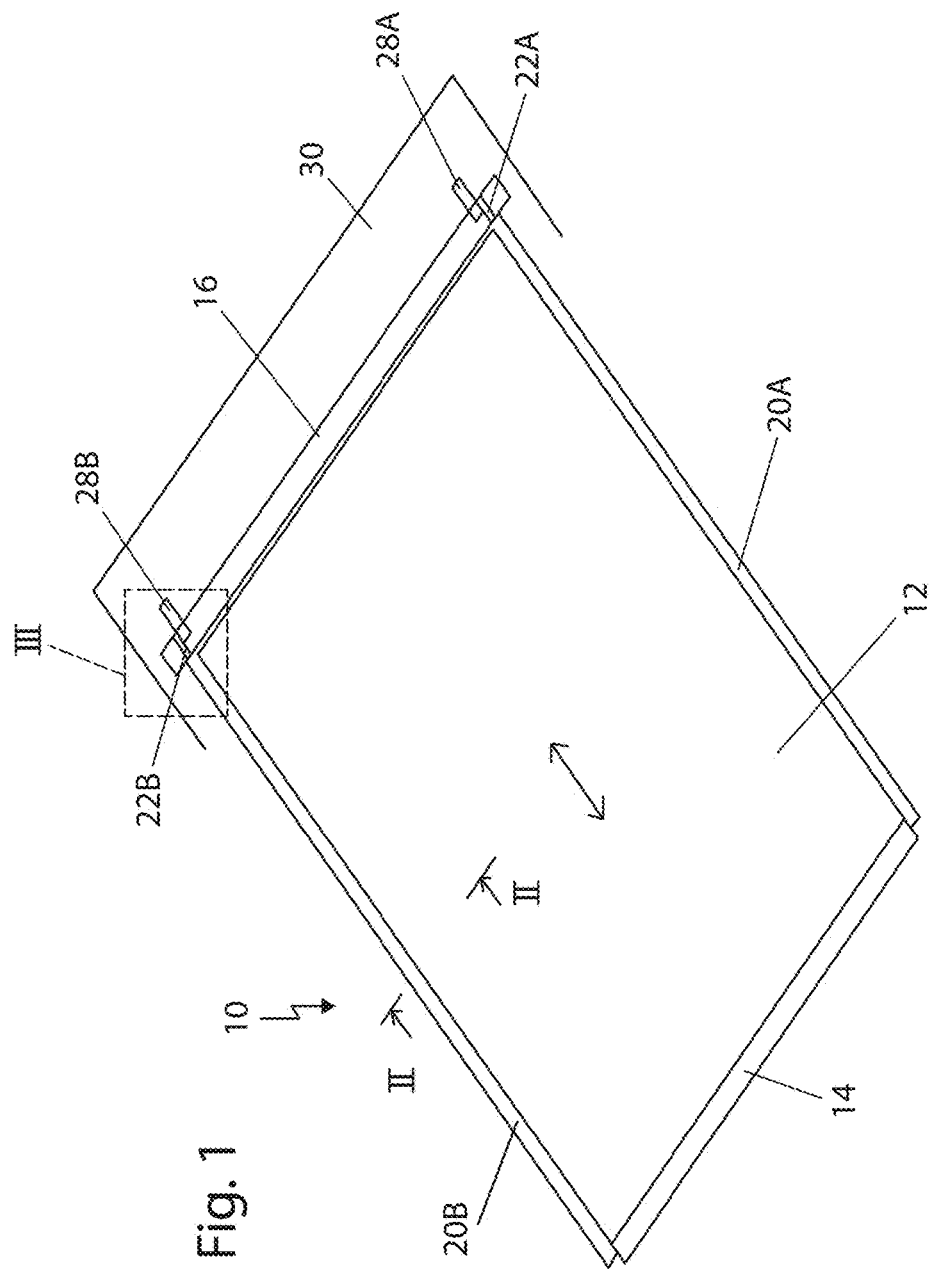
FIG. 1 shows a perspective plan view of a roller blind arrangement for a transparent roof element of a motor vehicle.
Figure 2:
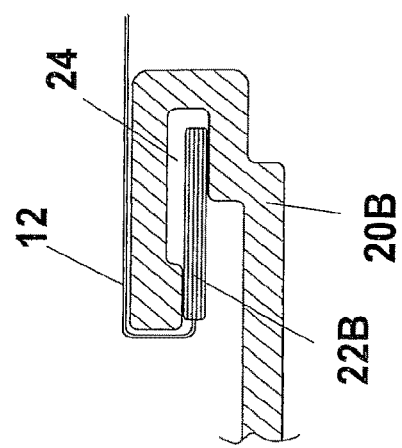
FIG. 2 shows a section along the line II-II in FIG. 1.
Figure 3:
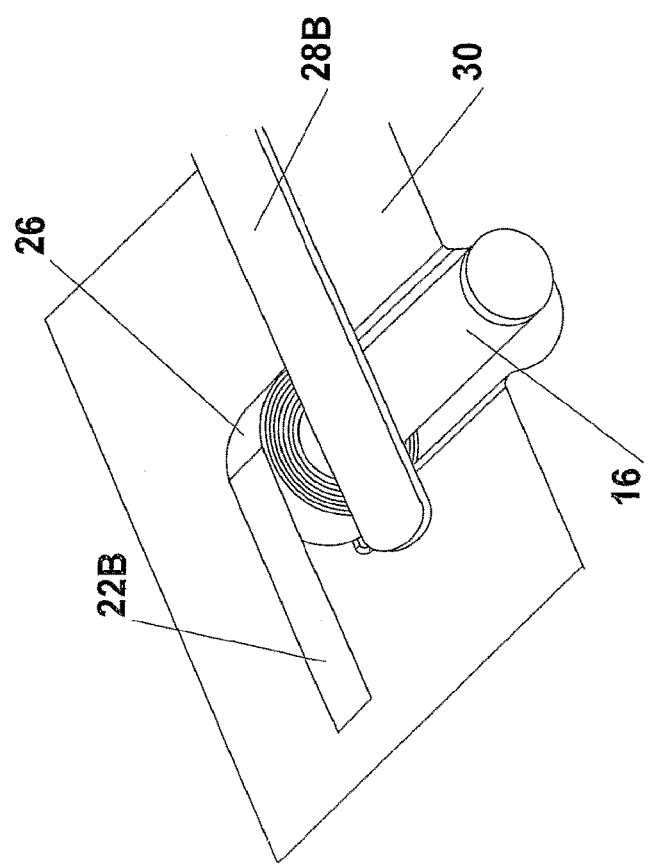
FIG. 3 shows an enlarged illustration of the region III which is boxed in by dashed lines in FIG. 1.

FIGS. 1 to 3 illustrate a roller blind arrangement 10 which serves to screen a roof region, which is designed to be transparent, of a motor vehicle (otherwise not illustrated specifically).

The roller blind arrangement 10 comprises a roller blind web 12 which is manufactured from a textile fabric, can be extended in the longitudinal direction of the vehicle and, for this purpose, is provided in its free longitudinal side with a pull bow 14 which can be actuated manually or electrically. At its end which faces away from the pull bow 14, the roller blind web 12 is fixed to a winding tube 16 of a winding shaft and can be wound onto the latter or unwound therefrom. The winding tube 16 is prestressed in the winding-up direction by means of a winding spring (not illustrated specifically here) which is designed in a customary manner and is clamped between a bearing axis of the winding shaft and the winding tube 16.

At its lateral borders, the roller blind web 12 is guided in guide rails 20A and 20B and is therefore kept tensioned in the transverse direction over its entire extension length.

In its lateral border regions, the roller blind web 12 has a respective metallic, flexible guide belt 22A and 22B guided in a guide track 24 of the relevant guide rail 20A and 20B. The guide track 24 is designed to be open on the outside with respect to the longitudinal center plane of the vehicle such that the relevant guide belt 22A or 22B can be introduced into the guide track 24 of the guide rail 20B by folding of the roller blind web 12 along edges running in the extension direction. The guide belts 22A and 22B are each sewn or adhesively bonded into a pocket of the roller blind web 12, which pocket is formed by its lateral border regions being turned over, or else are adhesively bonded onto the roller blind web 12.

As is gathered from FIG. 3, in which the guide belt 22B is illustrated without the roller blind web, when the roller blind web 12 is rolled up onto the winding tube 16, the guide belt 22B forms a winding body 26, the diameter of which changes as a function of the amount of extension of the roller blind web 12. The guide belt 22A behaves in a corresponding manner.

In order to prevent the individual coils of the guide belts 22A and 22B from slipping off from the relevant winding body 26 in the direction of the longitudinal center plane of the vehicle or coming to lie on or being unwound from the relevant winding body 26 in a manner such that they do not keep to their track, a respective resilient tab 28A and 28B is provided for each guide belt 22A and 22B and forms a winding guide for the relevant guide belt 22A and 22B. The tabs 28A and 28B each border the relevant winding body 26 and rest on the roller blind web 12. Consequently, that side of the respective winding body which is located on the inside with respect to the longitudinal center plane of the vehicle borders the outer border of the associated tab 28A and 28B.

The tabs 28A and 28B consequently prevent the lateral border regions of the roller blind web 12, which border regions are provided with the guide belts 22A and 22B, from undergoing a lateral offset on the winding tube 16.

In the present case, the tabs 28A and 28B are manufactured from spring steel and are screwed to a frame 30 of the roller blind arrangement 10. As an alternative, however, the tabs 28A and 28B can be manufactured from plastic and produced integrally with the frame 30, which constitutes a cast part.

Figure 4:
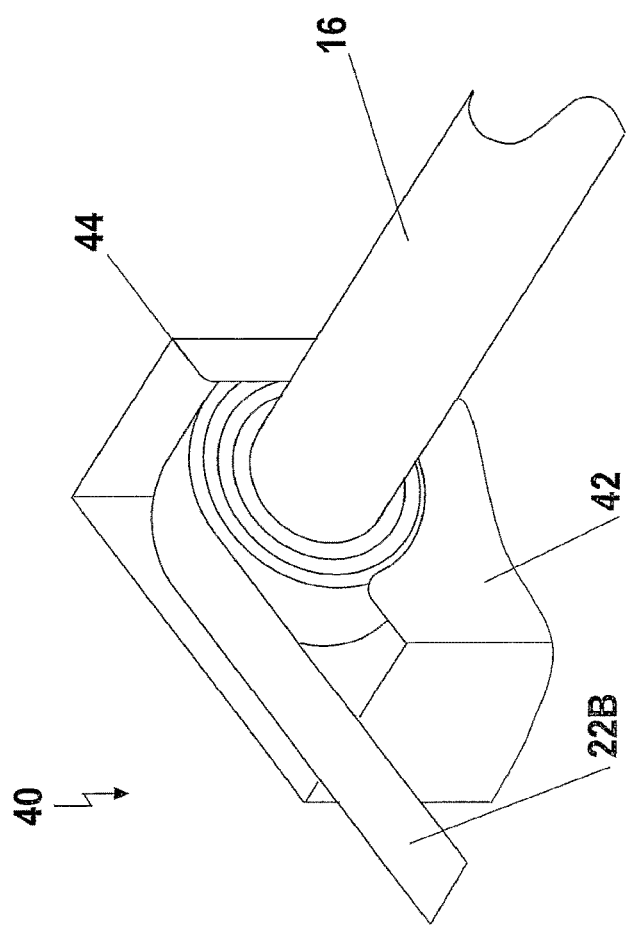
FIG. 4 shows a roller blind arrangement with a guide box for a guide belt of a roller blind web.

FIG. 4 illustrates a region of a roller blind arrangement 40 which essentially corresponds to that according to FIGS. 1 to 3 and likewise has lateral guide belts for a roller blind web (otherwise not illustrated specifically). FIG. 4 illustrates the guide belt 22B assigned to a lateral border region of the roller blind web.

The roller blind arrangement 40 has a guide box 42 which serves a winding guide and within which the guide belt 22B is wound up on and unwound from a winding tube 16 which, in the circumferential direction, is prestressed in the winding-up direction. On an inner wall, the guide box 42 has a curved cutout 44 in which the winding tube 16 rotates. The inner wall with the curved cutout 44 keeps the guide belt 22B in the guide box 42 and therefore ensures that the guide belt 22B or the associated roller blind web is wound up on and unwound from the winding tube 16 in a defined manner and such that it keeps to its track.

The guide box 42 is a separate component which is suspended in a resilient manner in order to be able to compensate for changes in the diameter of the coil of the roller blind web, the border of the curved cutout 44 interacting with the roller blind web such that the guide box yields further back as the winding body of the roller blind web increases in diameter.

Figure 5:
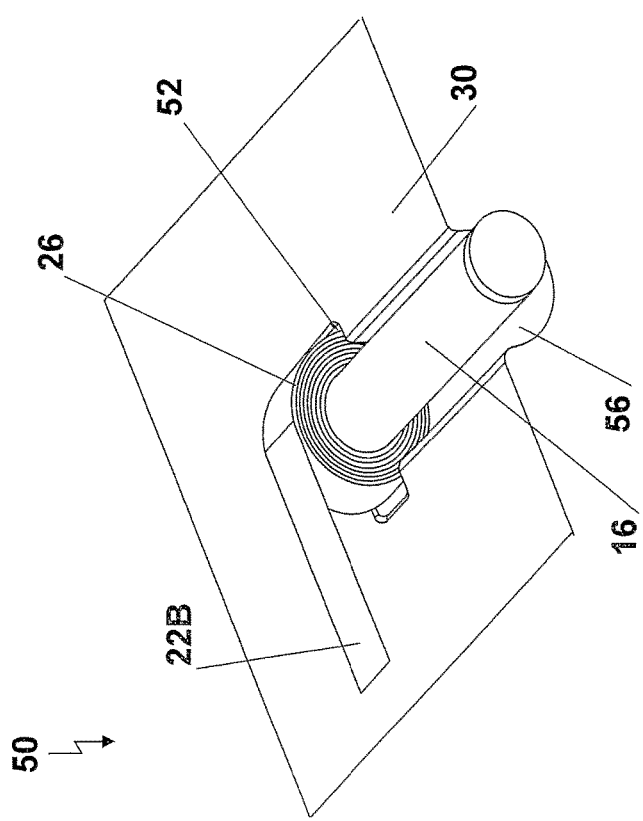
FIG. 5 shows a roller blind arrangement with an alternatively designed guide box for a guide belt of a roller blind web.

FIG. 5 illustrates a further embodiment of a roller blind arrangement 50 according to the invention which, again, essentially corresponds to that of FIGS. 1 to 3 and also differs from the latter in that it has a guide box 52 which operates in accordance with the principle of the guide box illustrated in FIG. 4 and consequently serves in the region of the winding shaft to guide and secure a lateral guide belt 22B of a roller blind web which can be wound onto a winding tube 16 of a winding shaft.

The guide box 52 differs from the guide box illustrated in FIG. 4 in that it is formed directly in a frame 30 of the roller blind arrangement. The guide box 52, which here is arranged rigidly with respect to the frame 30, has a curved cutout 54 which opens into a receiving space 56 for the winding tube 16 and for the roller blind web wound onto it.

The invention claimed is:

1. A roller blind arrangement for a motor vehicle, comprising:
   a roller blind web, a winding shaft and lateral guide rails, in each of which a respective flexible flat guide belt is arranged and engages a respective lateral border region of the roller blind web, and that each flat guide belt is guided in a respective guide rail of the lateral guide rails, wherein a respective lateral winding guide for each guide belt is provided externally in a region of the winding shaft and prevents a lateral offset of one of the respective guide belts on the winding shaft, each lateral winding guide being transverse to the winding shaft;

wherein the lateral winding guides are each formed from a member which is arranged adjacent to an inner edge of each respective guide belt and medial relative to the web; and wherein each member acts directly on the roller blind web.

2. The roller blind arrangement of claim 1, wherein each respective member is a flexible element.

3. The roller blind arrangement of claim 2, wherein the flexible element is a spring-elastic material.

4. The roller blind arrangement of claim 2, wherein the flexible element is a resilient tab.

5. The roller blind arrangement of claim 1, wherein the lateral winding guides are manufactured integrally with a frame of the roller blind arrangement.

6. The roller blind arrangement of claim 1, wherein the lateral winding guides are each a separate component which is fixed to a frame of the roller blind arrangement.

7. The roller blind arrangement of claim 1, wherein each respective guide belt on the winding shaft forms a winding body having a plurality of diameters.

8. The roller blind arrangement of claim 7, wherein the plurality of diameters is a function of the amount of an extension of the web.

9. The roller blind arrangement of claim 1, wherein the roller web comprises a pull bow at a first end; and at a second end, which faces away from the pull bow, the roller blind web is fixed to a winding tube of the winding shaft.

10. The roller blind arrangement of claim 1, wherein each flat guide belt is guided in a respective guide track of the lateral guide rails.

11. The roller blind arrangement of claim 10, wherein each guide track is configured to be open on an outside with respect to a longitudinal center plane of the vehicle, and wherein each flat guide belt extends into the respective guide track of the guide rail by folding of the roller blind web along edges running in an extension direction.

12. The roller blind arrangement of claim 1, wherein each respective member is a flexible element and wherein the lateral winding guides are manufactured integrally with a frame of the roller blind arrangement.

13. A roller blind arrangement for a motor vehicle, comprising: a roller blind web, a winding shaft and lateral guide rails, in each of which a respective flexible, flat guide belt is arranged and engages a respective lateral border region of the roller blind web, and that each flat guide belt is guided in a respective guide rail of the lateral guide rails, wherein a respective lateral winding guide for each guide belt is provided externally in a region of the winding shaft and prevents a lateral offset of a respective guide belt on the winding shaft, each lateral winding guide being transverse to the winding shaft;

wherein the lateral winding guides are each formed from a member which is arranged adjacent to the respective guide belt and medial relative to the web;

wherein each member is a separate component which compensates for changes in a diameter of a coil of the roller blind web during winding and unwinding; and wherein each member acts directly on the roller blind web such that each member yields as the roller blind web increases in diameter.

14. The roller blind arrangement of claim 3, wherein each member is arranged adjacent to an inner edge of the respective guide belt.

15. The roller blind arrangement of claim 13, wherein each respective member is a flexible element.

16. The rover blind arrangement of claim 13, wherein the respective guide belt on the winding shaft forms a winding body haying a plurality of diameters.

17. The roller blind arrangement of claim 16, wherein the plurality of diameters is a function of the amount of an extension of the web.

* * * * *